US010508815B2

(12) United States Patent
Signorino et al.

(10) Patent No.: US 10,508,815 B2
(45) Date of Patent: Dec. 17, 2019

(54) DOMESTIC OVEN WITH MUFFLE LIGHTING

(71) Applicant: emz-Hanauer GmbH & Co. KGaA, Nabburg (DE)

(72) Inventors: Manfredi Signorino, Wackersdorf (DE); Johann Schenkl, Bodenwoehr (DE); Martin Brabec, Nabburg (DE)

(73) Assignee: emz-Hanauer GmbH & Co. KGaA, Nabburg (DE)

( * ) Notice: Subject to any disclaimer, the term of this patent is extended or adjusted under 35 U.S.C. 154(b) by 0 days.

(21) Appl. No.: 15/682,593

(22) Filed: Aug. 22, 2017

(65) Prior Publication Data
US 2018/0128494 A1 May 10, 2018

(30) Foreign Application Priority Data

Aug. 23, 2016 (DE) .................. 10 2016 010 198

(51) Int. Cl.
*F24C 15/00* (2006.01)
*F21V 3/02* (2006.01)
(Continued)

(52) U.S. Cl.
CPC .............. *F24C 15/008* (2013.01); *F21V 3/02* (2013.01); *F21V 5/04* (2013.01); *F21V 7/22* (2013.01);
(Continued)

(58) Field of Classification Search
CPC .......... F21V 19/0015; F21V 3/02; F21V 5/04; F21V 7/22; F21V 7/00; F21V 19/007;
(Continued)

(56) References Cited

U.S. PATENT DOCUMENTS 9,261,281 B2 * 2/2016 Reinhard-Herrscher ..................
F24C 15/008
2004/0136198 A1 7/2004 Wimbert et al.
(Continued)

FOREIGN PATENT DOCUMENTS

DE 8602774 U1 3/1986
DE 20219483 U1 5/2003
(Continued)

OTHER PUBLICATIONS

French to English translation of EP 922910.*
(Continued)

*Primary Examiner* — Michael G Hoang
(74) *Attorney, Agent, or Firm* — Robert R. Deleault, Esq.; Mesmer & Deleault, PLLC

(57) ABSTRACT

A domestic oven includes a muffle which delimits a cooking chamber, and a lighting device for illuminating the cooking chamber. The muffle has in a muffle side wall a light outlet window into which a window element having a light outlet surface is fitted. The lighting device includes a light source which, when viewed normally to the muffle side wall, is arranged outside the contour of the light outlet window, a reflective surface with a diffuse reflecting property which is arranged behind the light outlet surface within the contour of the light outlet window and is irradiated with light from the light source, and a lens element with a collecting property which is arranged in the light path between the light source and the reflective surface. In some embodiments, the lens element is also arranged outside the contour of the light outlet window.

9 Claims, 2 Drawing Sheets

(51) Int. Cl.
*F21V 5/04* (2006.01)
*F21V 7/22* (2018.01)
*F21V 19/00* (2006.01)
F21Y 115/10 (2016.01)
F21W 131/307 (2006.01)

(52) U.S. Cl.
CPC ... *F21V 19/0015* (2013.01); *F21W 2131/307* (2013.01); *F21Y 2115/10* (2016.08)

(58) Field of Classification Search
CPC .............. F21V 15/00; F21V 2200/00; F21W 2131/307; F24C 15/008; G02B 6/00; F21S 41/322
USPC ...... 219/220, 390, 391; 99/467; 362/249.01, 362/249.02, 84; 126/19 R
See application file for complete search history.

(56) References Cited

U.S. PATENT DOCUMENTS

| | | | |
|---|---|---|---|
| 2004/0264168 A1 | 12/2004 | Gotz et al. | |
| 2005/0122709 A1* | 6/2005 | Ha | F24C 15/008 362/92 |
| 2007/0191675 A1* | 8/2007 | Diaz Sanchez | A61B 1/303 600/105 |
| 2011/0049120 A1* | 3/2011 | Reinhard-Herrscher | F24C 15/006 219/220 |
| 2014/0168972 A1* | 6/2014 | Ebner | F21V 5/007 362/235 |

FOREIGN PATENT DOCUMENTS

| | | | |
|---|---|---|---|
| DE | 102009055073 A1 | 6/2011 | |
| DE | 102010003115 A1 | 9/2011 | |
| DE | 102011088087 A1 | 6/2013 | |
| DE | 102012211202 A1 | 1/2014 | |
| DE | 102013210823 A1 | 12/2014 | |
| DE | 202015104549 U1 | 11/2015 | |
| DE | 202015104659 U1 | 12/2015 | |
| EP | 922910 * | 6/1999 | ............. F24C 15/00 |
| EP | 0922910 A1 | 6/1999 | |
| EP | 1442257 A1 | 8/2004 | |
| EP | 2128526 A1 | 2/2009 | |
| EP | 2128527 A1 | 2/2009 | |
| JP | 2012142252 A | 7/2012 | |
| KR | 20110058142 A | 6/2011 | |
| WO | 2004/085771 A1 | 10/2004 | |

OTHER PUBLICATIONS

German Patent Office search results dated Apr. 5, 2017 in copending German application DE 10 2016 010 198.9.

Korean Office Action in copending Korean application No. 10-2017-0106148, dated Aug. 17, 2018.

* cited by examiner

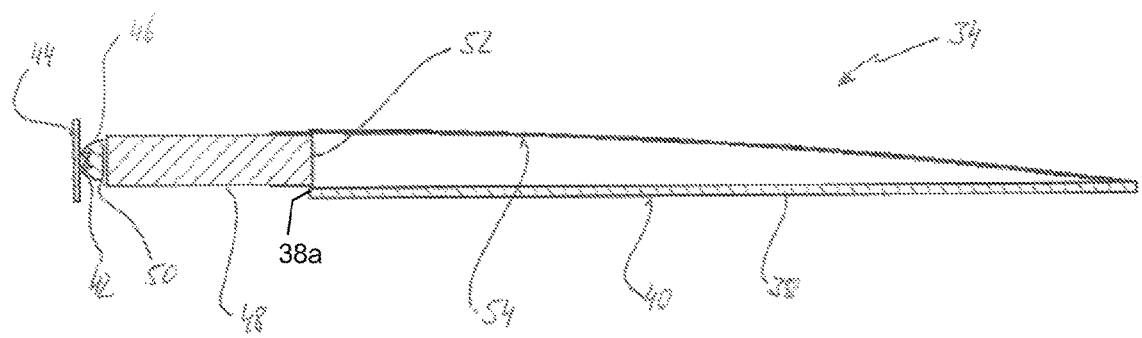
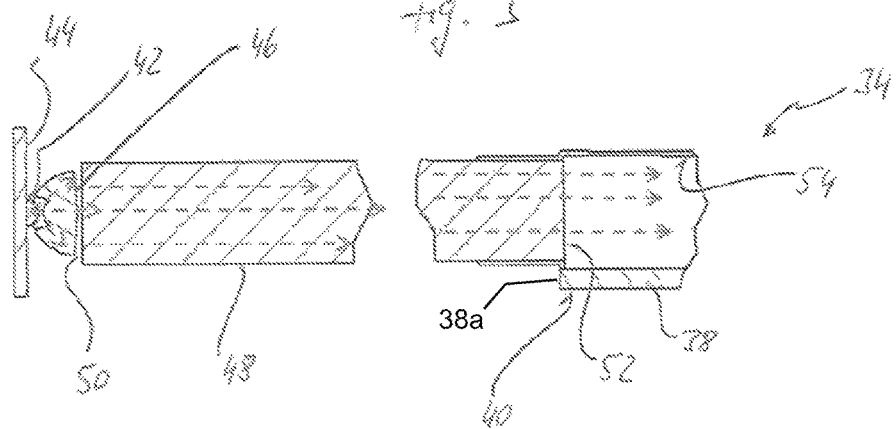
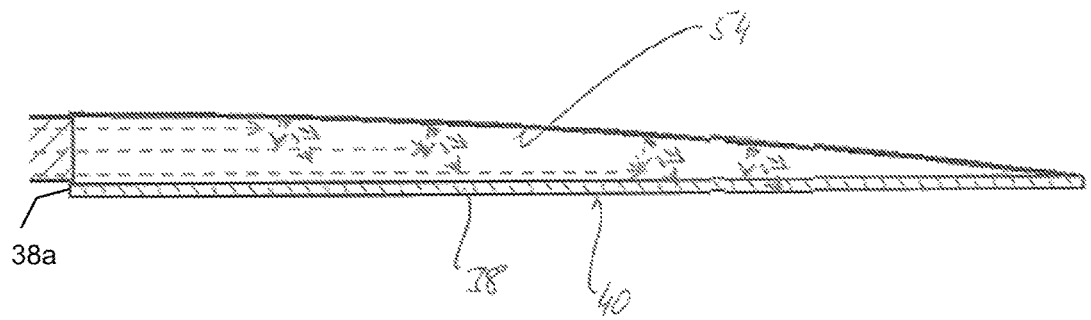

DOMESTIC OVEN WITH MUFFLE LIGHTING

BACKGROUND OF THE INVENTION

1. Field of the Invention

The present invention relates generally to a domestic oven with an illuminated cooking muffle.

2. Description of the Prior Art

In domestic ovens, it is known to provide measures for illuminating the muffle interior which serves as the cooking chamber. Without illumination for the cooking chamber, it would be difficult, or even impossible, for a user to visually assess the product in the oven during the cooking process. For the prior art relating to illuminated domestic ovens, reference is made, for example, to European patent specification EP 1 442 257 B1 and to German utility models DE 20 2015 104 659 U1 and DE 86 02 774 U1.

Important criteria when designing a lighting device for an oven muffle, in addition to the material costs, are that large regions of the cooking chamber are illuminated as brightly and as evenly as possible and that the user is not dazzled, that is to say the user should as far as possible not be dazzled by direct light from a light source.

SUMMARY OF THE INVENTION

The invention provides a domestic oven having a muffle which delimits a cooking chamber, and a lighting device for illuminating the cooking chamber. The muffle has in a muffle side wall a light outlet window into which a window element having a light outlet surface is fitted. The lighting device comprises a light source which, when viewed normally (i.e. perpendicularly) to the muffle side wall, is arranged outside the contour of the light outlet window, a reflective surface with a diffuse reflection property which is arranged behind the light outlet surface within the contour of the light outlet window and is irradiated with light from the light source, and a lens element with a collecting property which is arranged in the light path between the light source and the reflective surface. Because the light source is arranged outside the contour of the light outlet window, no direct light from the light source reaches the cooking chamber. The diffuse reflection of the reflective surface ensures that large parts of the cooking chamber are illuminated evenly. At the same time, the light source can be arranged at a sufficient distance from the hot regions of the oven, so that particularly heat-resistant and thus expensive forms of the light source are not necessary and less expensive standard articles can be used instead. By means of the lens element, a large proportion of all the light emitted by the light source can nevertheless be collected; little light is lost.

In some embodiments, the lens element is also arranged outside the contour of the light outlet window.

The reflective surface is in some embodiments formed by a white surface. This can be formed, for example, by a white layer of paint on a background surface. Alternatively, the reflective surface can be formed by a reflector body produced from a white plastics or ceramics material. Especially where the reflective surface is required to withstand very high temperatures, a ceramics material may be more suitable than a plastics material. A sheet-metal part on which the reflective surface is formed and which can be provided, for example, with suitable embossed structures is also able to withstand high temperatures well.

In some embodiments, the reflective surface, when viewed in a sectional plane normal to the muffle side wall and oriented along a centre line of a light beam emerging from the lens element, is curved in the manner of an arc.

In some embodiments, the reflective surface fills substantially the entire region within the contour of the light outlet window. The light outlet window can have an elongate rectangular shape and be oriented on its end.

In order that the light source is particularly far removed from the hot regions of the oven, it is proposed that the light source is arranged outside and preferably above the contour of the muffle side wall.

A great freedom of choice in terms of the positioning of the light source in relatively cooler regions of the oven is ensured by a measure in which a light guiding structure having a light entry point and a light exit point is arranged in the light path between the lens element and the reflective surface, wherein a light beam entering the light guiding structure at the light entry point is guided therein along a defined light guiding path to the light exit point.

The invention will be explained in greater detail below by means of the accompanying drawings.

BRIEF DESCRIPTION OF THE DRAWINGS

FIG. 2 is a sectional view of the muffle lighting unit of FIG. 1a.

FIG. 3 shows the muffle lighting unit of FIG. 2 broken down into individual sections, wherein in each section the ray path of light rays which are generated by a light source of the muffle lighting unit is shown.

DETAILED DESCRIPTION OF THE INVENTION

Figure 1A:
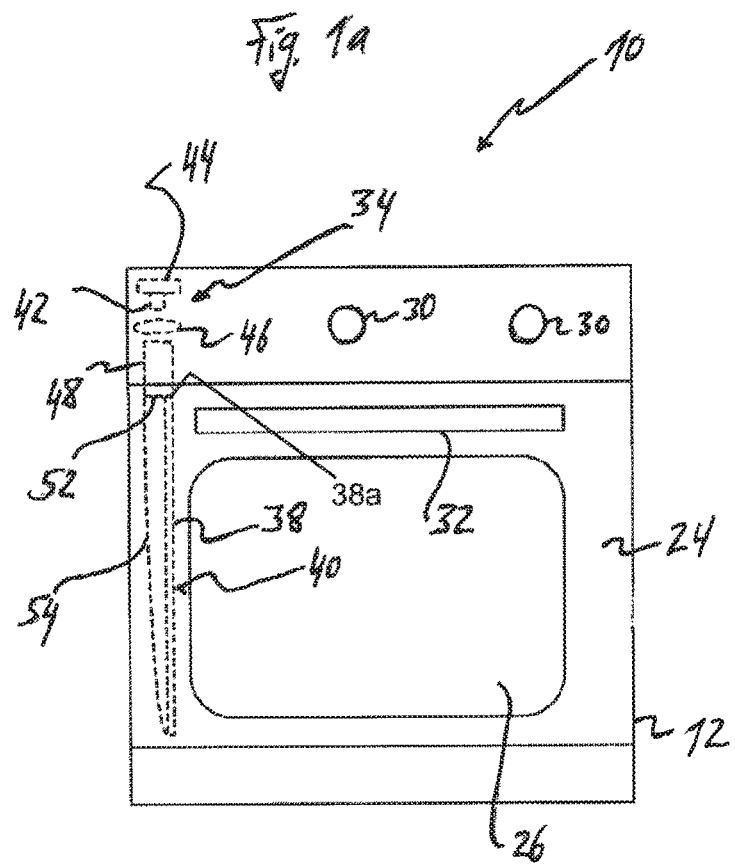
FIG. 1a is a schematic front view of a domestic oven according to one embodiment, wherein components of a muffle lighting unit are shown.
Figure 1B:
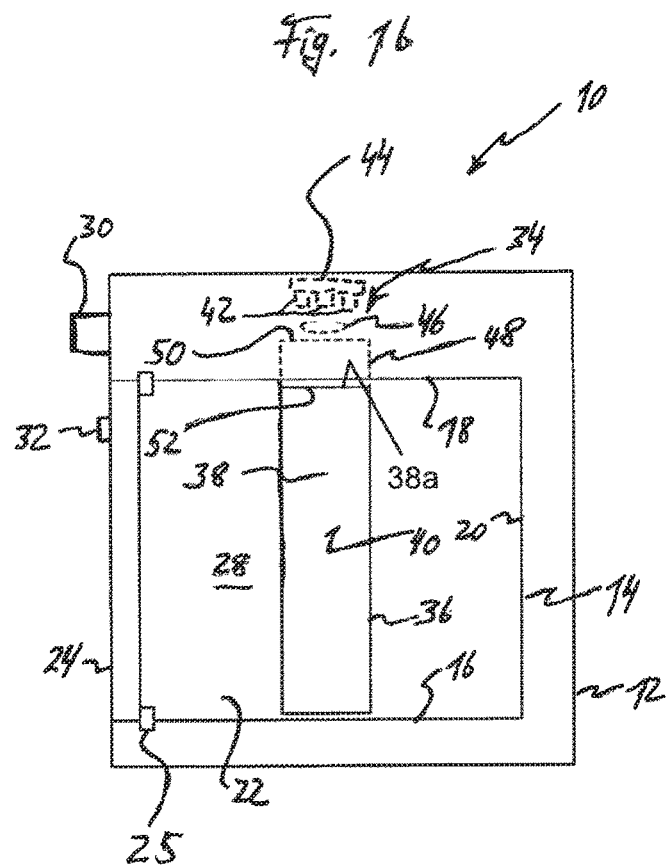
FIG. 1b shows, schematically, the oven of FIG. 1a in a vertical section.

Reference will first be made to FIGS. 1a and 1b. The domestic oven shown schematically therein is designated generally 10. It can be a pyrolysis oven, that is to say have a self-cleaning function, in which strong heating causes pyrolytic decomposition of undesired cooking residues. The oven 10 comprises an outer housing 12 in which an oven muffle 14 is arranged in a manner known per se. The oven muffle 14 has a bottom wall 16, a top wall 18, a rear wall 20, and two mutually opposite vertical side walls 22. An oven door 24, which is attached to the outer housing 12 so as to be pivotable about a horizontal axis, serves to close the oven muffle 14. A door seal 25 is fitted between the oven door 24 and the oven muffle 14. In the oven door 24 there is provided a viewing window 26, through which the user can look into a cooking chamber 28 formed inside the oven muffle 14.

Above the oven door 24 there is arranged, on the front of the oven, an operating panel with operating elements 30 for operating the oven 10. A control assembly (not shown), which performs the control functions of the oven 10, is accommodated behind the control panel and above the oven muffle 14.

Also shown in FIGS. 1a, 1b is a handle bar 32 which is arranged on the oven door 24 above the viewing window 26 and serves to open and close the oven door 24.

The oven 10 further comprises a muffle lighting unit 34 which serves to illuminate the cooking chamber 28. The lighting unit 34 generates light, which passes through a light outlet window 36 formed in one of the side walls 22 of the muffle 14 into the muffle interior (cooking chamber 28). The light outlet window 36 is formed by a corresponding opening in the particular side wall 22 of the muffle 14. Although only one lighting unit 34 is represented in the example shown, it is possible in other embodiments for a lighting unit 34 to be associated with each of the two side walls 22. It is likewise conceivable that a plurality of light outlet windows 36, each of which has an associated lighting unit 34, is formed in at least one of the side walls 22.

In the example shown, the light outlet window 36 is rectangular and oriented on its end (i.e. upright), that is to say the longer rectangle sides extend vertically and the shorter rectangle sides extend horizontally. As can clearly be seen in particular in FIG. 1*b*, the light outlet window 36 extends over a large part of the height of the muffle 14, which permits good illumination of the different height regions of the cooking chamber 28. For example, the light outlet window 36 has a height in a range between approximately 20 cm and approximately 35 cm. In terms of width, the light outlet window 36 has a dimension between approximately 5 cm and approximately 8 cm, for example.

Reference will now additionally be made to FIG. 2. A window element 38 is fitted into the light outlet window 36, which window element forms a light outlet surface 40 on its side facing the cooking chamber 28. The window element 38 is made of transparent material and is manufactured, for example, from moulded glass, which is resistant to high temperatures. In the example shown, the window element 38 is formed by a sheet element, the sheet contour of which corresponds to the contour of the light outlet window 36. The sheet thickness of the window element 38 is, for example, between approximately 5 mm and approximately 10 mm. If desired, the window element 38 can have a surface structure (e.g. in the manner of a honeycomb pattern) in the region of the light outlet surface 40, by means of which surface structure a large number of microlenses is formed. These microlenses can have a size, for example, in the region of a few millimetres, for example 2 mm to 3 mm, and together have, for example, a homogenising effect for the light emitted into the cooking chamber 28.

The lighting unit 34 further comprises at least one light source 42, which is formed, for example, by an arrangement of one or more light-emitting diodes (as in FIG. 1*b*). The light source 42 is mounted on a support element 44, which is, for example, a printed circuit board. A lens element 46 in the form of a collecting lens collects light emitted by the light source 42. The at least one light source 42 is a white light source and is, as is readily apparent from the representations in FIGS. 1*a*, 1*b*, arranged in a region of the oven 10 which, when seen in the vertical direction, lies above the muffle 14 and accordingly outside the contour of the light outlet window 36 when viewed in a normal direction to the wall plane of the particular side wall 22 (corresponding to a view as in FIG. 1*b*). The lens element 46 is also arranged—when viewed in the vertical direction—above the muffle 14. The reduction in the divergence of the light beam emitted by the light source 42 that is effected by the lens element 46 makes it possible to arrange both the light source 42 and the lens element 46 comparatively far (when viewed in the vertical direction) from the light outlet window 36 and nevertheless, without substantial light losses, guide at least a large part of all the light emitted by the light source 42 into the region of the light outlet window 36 and thus utilize it for illuminating the cooking chamber 28. Commercially available light-emitting diodes often have a comparatively large opening angle of the main beam of emitted light (e.g. between approximately 120 and approximately 150 degrees). Without a collecting lens element, a light-emitting diode would have to be arranged comparatively close to the light outlet window 36 in order to avoid excessive light losses. However, such an arrangement would mean that the light-emitting diode (or generally: the light source 42) was arranged in a comparatively hot region of the oven 10. This would have the result that an extremely temperature-resistant model would have to be used for the light source 42 or active cooling would have to be provided, which would be accompanied by corresponding costs. Owing to the comparatively distant arrangement of the light source 42 and the lens element 46 in the embodiment shown, it is possible, by contrast, to choose for these components comparatively inexpensive models, which only have to withstand lower thermal loads.

The light source 42 and the lens element 46 are so oriented that the beam axis of the light beam on the outlet side of the lens element 46 is oriented substantially vertically downwards. In the light path downstream of the lens element 46 there is a light guiding structure 48, which has a light entry side 50 and a light exit side 52 (FIG. 2). The light beam delivered by the lens element 46 enters the light guiding structure 48 at the light entry point 50 and is guided therein, substantially without loss, to the light exit point 52. The light guiding structure 48 is, for example, a solid body made of transparent material. In this case, guiding of the light rays of the light beam that enters at the light entry point 50 is effected by total reflection at the outer surface of the light guiding structure 48. Alternatively, the light guiding structure 48 can be formed by a hollow guiding body. Guiding of the light rays of the light beam is effected in this case by specular reflection at the inner peripheral surface of the hollow guide body delimiting the cavity. In the case of the configuration of the light guiding structure 48 as a solid body, the light entry point 50 and the light exit point 52 are each in the form of, for example, a planar end face with a vertical surface normal. In the case of the configuration of the light guiding structure 48 as a hollow guiding body, on the other hand, the light entry point 50 and the light exit point 52 are in the form of openings. By means of the light guiding structure 48, the light delivered by the lens element 46 is guided to a point which is relatively hotter during operation, in particular pyrolysis operation, of the oven 10. The light guiding structure 48 thus serves to bridge the distance from the relatively colder regions, in which the light source 42 and the lens element 46 are located, to the relatively hotter region close to the window element 38. Concretely, in the example shown, the light guiding structure 48 extends as far as the upper window edge 38*a* of the window element 38, as can be seen particularly clearly in FIG. 2. At the light exit point 52, the light guided in the light guiding structure 48 exits again with a substantially vertical orientation of the beam axis of the light beam, that is to say substantially parallel to the sheet plane of the window element 38. In as much as a parallelisation (collimation) of the light beam emitted by the light source 42 is effected by the lens element 46, a corresponding parallelised light beam emerges at the light exit point 52.

A reflective surface 54 effects diffuse reflection of light rays which emerge at the light exit point 52 and strike the reflective surface 54. The reflective surface 54 is arranged within the contour of the light outlet window 36 and has—when viewed in a direction normal to the light outlet surface 40—an extension which corresponds substantially to the entire size of the light outlet window 36. When the light outlet surface 40 is viewed from above (corresponding to the representation in FIG. 1b), the reflective surface 54 accordingly likewise has the contour of a rectangular strip, just like the light outlet window 36. The light exit point 52 of the light guiding structure 48 is adjacent to the vertically upper narrow side of the window element 38. In the region of this narrow side, the reflective surface 54 in the sectional view of FIG. 2 is at the greatest distance from the window element 38. As the distance from the vertically upper narrow side of the window element 38 increases, the distance between the reflective surface 54 and the window element 38 continuously becomes smaller. The reflective surface 54 has a curvature in this direction which corresponds in a good approximation to the curvature of the cutting blade of a kitchen knife used to cut raw meat. In the region of the vertically lower narrow side of the window element 38, the distance of the reflective surface 54 from the window element 38 has fallen substantially to zero. As a result of this smooth curvature of the reflective surface 54, comparatively even light distribution over the full extent of the window element 38 can be achieved. Instead of a smooth curvature, the reflective surface 54 can also have a stepped curvature, the reflective surface 54 being composed of a plurality of step portions, each of which is comparatively small, which follow one another in the direction of curvature.

When viewed in a horizontal sectional plane, the reflective surface 54 can extend linearly at a constant distance from the window element 38. Alternatively, it is conceivable that, when viewed in such a horizontal section, the reflective surface 54 extends with an arc-like curvature at least along a portion of the width of the window element 38. If the lighting unit 34 contains a plurality of light sources 42 distributed in the direction of the width of the window element 38, the reflective surface 54, when viewed in a horizontal section, can have a wavy course, whereby it has a wave peak associated with each light source 42. When there is only a single light source 42, the reflective surface 54 can accordingly have a single wave peak. Towards the ends of the narrow side of the window element 38, the reflective surface 54 can approach the window element 38 in an arc-like curve. Corresponding considerations apply to the cross-sectional form of the light guiding structure 48 (i.e. when viewed in a horizontal section). For example, the light guiding structure 48 can have, in the direction from the light entry point 50 to the light outlet point 52, a cylindrical form or a form which tapers in the manner of a cone and can have a rectangular, circular or oval contour in cross-section. Where there is a plurality of light sources 42 arranged horizontally next to one another, the cross-sectional form of the light guiding structure 48 can be composed of a corresponding number of individual portions, wherein the individual portions can merge smoothly into one another, for example.

In order to achieve the property of the reflective surface 54 as a diffuse reflector, the reflective surface 54 is in the form of a white surface in some embodiments. A white surface can simulate a Lambert radiator in a good approximation. For example, the reflector surface 54 can be formed on a reflector body, for example made of a sheet-metal material, which is painted with a white colour layer. Alternatively, a reflector body produced from a white plastics material by injection moulding, for example, or manufactured from a white ceramics material can be used to form the reflective surface 54. In the embodiment shown, the gap between the reflective surface 54 and the window element 38 is a free space, which can be filled with air. In other embodiments, a solid body produced from a transparent material, for example moulded glass, is provided instead of the window element 38, which solid body forms both the reflective surface 54 and the light outlet surface 40. This solid body can be painted on the outside with a white colour layer in order to form the reflective surface 54.

FIG. 3 shows an example of a ray path of light rays within the lighting unit 34. The light rays are indicated by broken lines with arrow heads at the ends of the lines. The arrows pointing away from the reflective surface 54 in different directions indicate the diffuse reflection.

In some embodiments, the oven 10 is designed for grilling with direct infra-red radiation. In this mode of operation, infra-red radiation is produced by means of a heating coil (not shown in the drawings) arranged in the muffle interior in the region of the top wall 18, which infra-red radiation strikes the food to be grilled directly and thereby causes the pronounced browning effect on the grilled food that is typical of grilling. In order to prevent some of the infra-red radiation from passing through the window element 38 to the outside, the window element 38 in these embodiments can have an infra-red barrier function. To that end, the window element can have a suitable filter coating, for example on its surface facing the cooking chamber 28. Because such a barrier filter prevents or at least reduces the passage of infra-red radiation of the grilling function of the oven 10 through the window element 38, the barrier filter constitutes heat protection for the lighting unit 34.

Although the preferred embodiments of the present invention have been described herein, the above description is merely illustrative. Further modification of the invention herein disclosed will occur to those skilled in the respective arts and all such modifications are deemed to be within the scope of the invention as defined by the appended claims.

What is claimed is:
1. A domestic oven comprising:
a muffle which delimits a cooking chamber, the muffle having a muffle side wall, a light outlet window formed within the muffle side wall, and a window element having a light outlet surface fitted within the light outlet window, the window element having an upper window edge; and
a lighting device for illuminating the cooking chamber, the lighting device comprising:
a light source which, when viewed normally to the muffle side wall, is arranged above the muffle;
a reflective surface with a diffuse reflecting property which is arranged behind the window element within a contour of the light outlet window and is irradiated with light from the light source;
a lens element with a collecting property which is arranged in a light path between the light source and the reflective surface, the lens element being arranged, when viewed normally to the muffle side wall, above the muffle; and
a light guiding structure having a light entry point and a light exit point which are arranged in the light path between the lens element and the reflective surface, wherein the light guiding structure is formed by a solid body made of a transparent material wherein a light beam entering the light guiding structure at the light entry point is guided therein by total reflection to the light exit point,
wherein the light entry point is arranged, when viewed normally to the muffle side wall, above the muffle, wherein the light guiding structure extends as far as the upper window edge of the window element and the light exit point is arranged adjacent the upper window edge of the window element.

2. The domestic oven according to claim 1, wherein the reflective surface is formed by a white surface.

3. The domestic oven according to claim 1, wherein the reflective surface, when viewed in a sectional plane normal to the muffle side wall and oriented along a centre line of a light beam emerging from the lens element, is curved in the manner of an arc.

4. The domestic oven according to claim 1, wherein the reflective surface fills substantially the entire region within the contour of the light outlet window.

5. The domestic oven according to claim 1, wherein the window element has an elongate rectangular shape and is oriented upright.

6. The domestic oven according to claim 1, wherein at least one of the light entry point and the light exit point is formed by a planar end face of the solid body, the planar end face oriented to have a vertical surface normal.

7. The domestic oven according to claim 1, wherein the light source of the lighting device is one of a plurality of light sources, and each of the plurality of light sources being arranged next to each other in a horizontal line, the solid body arranged in the light path between the plurality of light sources and the reflective surface.

8. The domestic oven according to claim 1, wherein the solid body has a rectangular cross section.

9. A domestic oven comprising:
   a muffle which delimits a cooking chamber, the muffle having a vertical muffle side wall, an opening formed within the muffle side wall, and a window element having a light outlet surface fitted within the opening, the window element having a vertically upper window edge; and
   a lighting device for illuminating the cooking chamber, the lighting device comprising:
      a plurality of light sources arranged next to each other in a horizontal line, the plurality of light sources being arranged, when viewed normally to the muffle side wall, above the muffle;
      a reflective surface with a diffuse reflecting property which is arranged behind the window element within a contour of the opening and is irradiated with light from the plurality of light sources;
      a lens element with a collecting property which is arranged in the light path between the plurality of light sources and the reflective surface, the lens element being arranged, when viewed normally to the muffle side wall, above the muffle; and
      a solid light guiding body made of a transparent material and arranged to guide light received, via the lens element, from the plurality of light sources to the reflective surface,
   wherein the light guiding body has a light entry point which is arranged, when viewed normally to the muffle side wall, above the muffle,
   wherein a light beam entering the light guiding body at the light entry point is guided therein by total reflection to the reflective surface,
   wherein the light guiding body extends as far as the upper window edge of the window element.

* * * * *